(12) United States Patent
Kumar et al.

(10) Patent No.: US 12,142,911 B2
(45) Date of Patent: Nov. 12, 2024

(54) FAULT DETECTOR FOR BIPOLE POWER TRANSMISSION SCHEMES

(71) Applicant: General Electric Technology GmbH, Baden (CH)

(72) Inventors: Amit Kumar, Stafford (GB); Ossama El Sanharawi, Stafford (GB)

(73) Assignee: GE INFRASTRUCTURE TECHNOLOGY LLC, Greenville, SC (US)

( * ) Notice: Subject to any disclaimer, the term of this patent is extended or adjusted under 35 U.S.C. 154(b) by 144 days.

(21) Appl. No.: 18/042,494

(22) PCT Filed: Sep. 2, 2021

(86) PCT No.: PCT/EP2021/074256
§ 371 (c)(1),
(2) Date: Feb. 22, 2023

(87) PCT Pub. No.: WO2022/049188
PCT Pub. Date: Mar. 10, 2022

(65) Prior Publication Data
US 2023/0327427 A1    Oct. 12, 2023

(30) Foreign Application Priority Data
Sep. 4, 2020 (EP) .................... 20275136

(51) Int. Cl.
*H02H 7/26* (2006.01)
*H02H 3/16* (2006.01)
*H02J 3/36* (2006.01)

(52) U.S. Cl.
CPC .............. *H02H 7/268* (2013.01); *H02J 3/36* (2013.01); *H02H 3/16* (2013.01); *H02H 7/261* (2013.01)

(58) Field of Classification Search
CPC .... H02J 3/36; H02H 3/14; H02H 3/16; H02H 3/167; H02H 3/17; H02H 7/26–263; H02H 7/267; H02H 7/268
See application file for complete search history.

(56) References Cited

U.S. PATENT DOCUMENTS 3,968,419 A * 7/1976 Ekstrom .................. H02J 3/36
                                                              363/51
4,200,907 A * 4/1980 Hausler .................. H02J 3/36
                                                              363/51
(Continued)

FOREIGN PATENT DOCUMENTS

CN    103296673 A      9/2013
CN    104297627 A *    1/2015    ......... E21B 41/0085
(Continued)

OTHER PUBLICATIONS

Y. Kato et al., "Neutral Line Protection System for HVDC Transmission," in IEEE Transactions on Power Delivery, vol. 1, No. 3, pp. 326-331, Jul. 1986, doi: 10.1109/TPWRD.1986.4308010. Obtained on Sep. 19, 2024. (Year: 1986).*
(Continued)

*Primary Examiner* — Fred E Finch, III
(74) *Attorney, Agent, or Firm* — Eversheds-Sutherland (US) LLP

(57) ABSTRACT

A bipole power transmission scheme typically includes a first converter station that is positioned remote from a second converter station, along with first and second transmission conduits which interconnect the first and second converter stations to permit the transmission of power between the first and second converter stations. The first converter station has first and second power converters, with the first power converter including a first DC terminal that is connected with the first transmission conduit, at least one AC terminal which is connected with a first AC network, and
(Continued)

a second DC terminal that is interconnected with a third DC terminal of the second power converter by a first interconnection which defines a first neutral area. The second power converter additionally includes a fourth DC terminal that is connected with the second transmission conduit and at least one AC terminal which is connected with a second AC network.

12 Claims, 4 Drawing Sheets

(56) References Cited

U.S. PATENT DOCUMENTS

| | | | | |
|---|---|---|---|---|
| 5,272,617 A * | 12/1993 | Nakamura | ............. | H02H 7/268 |
| | | | | 363/51 |
| 5,592,369 A * | 1/1997 | Bjorklund | ................ | H02J 3/36 |
| | | | | 363/51 |
| 5,737,166 A * | 4/1998 | Hagman | ................... | H02J 3/36 |
| | | | | 361/115 |
| 2012/0256637 A1* | 10/2012 | Juhlin | ................... | H02H 7/268 |
| | | | | 324/750.01 |
| 2018/0109109 A1* | 4/2018 | Holmgren | ................ | H02J 1/06 |
| 2020/0266721 A1* | 8/2020 | Mukhedkar | ............... | H02J 3/36 |
| 2021/0119444 A1* | 4/2021 | Sonnathi | ................ | H02J 3/001 |

FOREIGN PATENT DOCUMENTS

| | | |
|---|---|---|
| JP | H11289670 A | 10/1999 |
| JP | 2017192179 A | 10/2017 |
| WO | WO-2020038805 A1 * 2/2020 | ............. H02H 7/125 |

OTHER PUBLICATIONS

Machine translation of CN-104297627-A, Jan. 21, 2015. Obtained from internal USPTO databases on Sep. 21, 2024. (Year: 2015).*
Pathirana et al.: Protection Strategy for HVDC Systems With Dedicated Metallic Return (DMR) Conductors. Symposium Lund 2015. Retrived from the Internet: URL:https://e-cigre.org/publication/SYMP_LUN_2015-symposium-und-2015 [retrieved on Mar. 28, 2023].
International Search Report and Written Opinion for PCT/EP2021/074256, dated Oct. 3, 2022, 11 pages.
EPO Search Report and Opinion for EP 20275136.8, dated Feb. 26, 2021, 7 pages.

* cited by examiner

FAULT DETECTOR FOR BIPOLE POWER TRANSMISSION SCHEMES

This invention relates to a fault detector for a bipole power transmission scheme, respective bipole power transmission schemes including such a fault detector, and to a method of detecting a fault in such bipole power transmission schemes.

In high voltage direct current (HVDC) power transmission networks AC power is typically converted to DC power for transmission via overhead lines, under-sea cables and/or underground cables. This conversion removes the need to compensate for the AC capacitive load effects imposed by the power transmission medium, i.e. the transmission line or cable, and reduces the cost per kilometre of the lines and/or cables, and thus becomes cost-effective when power needs to be transmitted over a long distance. DC power can also be transmitted directly from offshore wind parks to onshore AC power transmission networks.

The conversion between DC power and AC power is utilised where it is necessary to interconnect DC and AC networks. In any such power transmission network, converters (i.e. power converters) are required at each interface between AC and DC power to effect the required conversion from AC to DC or from DC to AC.

The choice of a suitable HVDC power transmission scheme within a HVDC power transmission network differs, depending on the application and scheme features. One type of such scheme is a bipole power transmission scheme, which may or may not include a return conduit, e.g. in the form of a dedicated metallic return, and which may be configured to operate in various different modes, such as a rigid bipole, a monopole with dedicated return conduit, or a monopole utilising one of normal first and second transmission conduits as a return path.

According to a first aspect of the invention there is provided a fault detector for a bipole power transmission scheme including a first converter station positioned remote from a second converter station and first and second transmission conduits interconnecting the first and second converter stations to permit the transmission of power between the first and second converter stations, the first converter station having first and second power converters, the first power converter including a first DC terminal connected with the first transmission conduit, at least one AC terminal connected with a first AC network, and a second DC terminal interconnected with a third DC terminal of the second power converter by a first interconnection defining a first neutral area, the second power converter additionally including a fourth DC terminal connected with the second transmission conduit and at least one AC terminal connected with a second AC network, the first converter station additionally including a first grounding circuit connected in use between the first neutral area and ground and switchable into and out of operation, and at least one of a first current sensor configured in use to measure the flow of current between the first neutral area and ground and a first voltage measurer configured in use to measure the voltage difference between the first neutral area and ground, and the second converter station having third and fourth power converters, the third power converter including a fifth DC terminal connected with the first transmission conduit, at least one AC terminal connected with a third AC network, and a sixth DC terminal interconnected with a seventh DC terminal of the fourth power converter by a second interconnection defining a second neutral area, the fourth power converter additionally including an eighth DC terminal connected with the second transmission conduit and at least one AC terminal connected with a fourth AC network, the second converter station additionally including a second grounding circuit connected in use between the second neutral area and ground and switchable into and out of operation, and at least one of a second current sensor configured in use to measure the flow of current between the second neutral area and ground and a second voltage measurer configured in use to measure the voltage difference between the second neutral area and ground, the fault detector comprising a fault detector controller arranged in use in operative communication with the first and second grounding circuits and at least the first and second current sensors or the first and second voltage measurers, and being programmed to detect a ground fault in one or other of the first and second neutral areas by:

configuring the first grounding circuit to be in operation and the second grounding circuit to be out of operation;

checking for at least one of a first erroneous current flow in the first neutral area using the first current sensor and a first erroneous voltage in the second neutral area using the second voltage measurer;

recognising a ground fault in the second neutral area if a first erroneous current flow is identified or if a first erroneous voltage is identified;

configuring the first grounding circuit to be out of operation and the second grounding circuit to be in operation;

checking for at least one of a second erroneous current flow in the second neutral area using the second current sensor and a second erroneous voltage in the first neutral area using the first voltage measurer; and recognising a ground fault in the first neutral area if a second erroneous current flow is identified or if a second erroneous voltage is identified.

Having such a fault detector including a fault detector controller which is programmed to configure the first grounding circuit to be in operation while the second grounding circuit is out of operation and then, alternately, to configure the first grounding circuit to be out of operation while the second grounding circuit is in operation, advantageously compensates for the sensitivity of fault detection normally decreasing as a ground fault location moves towards a converter station which is grounded, i.e. as the point at which the ground fault occurs lies closer to the converter station which has its neutral area electrically connected to ground by a corresponding grounding circuit that is switched into operation.

Such alternate grounding of one converter station and then another permits any fault which is close to one converter station, and so not usually readily detected, to be detected when the other converter station is grounded, such that the same fault is then relatively far away and the corresponding fault detection sensitivity is thereby sufficiently high to detect the fault.

Moreover, an ability to detect ground faults throughout the power transmission scheme, i.e. close to both converter stations, is beneficial since a failure to detect such a fault, e.g. at a later stage when the scheme is required to transmit high power, will lead to a loss of revenue by the power distributor and also reduce the overall utilisation and availability of the scheme.

Preferably the bipole power transmission scheme additionally includes a return conduit interconnecting the first neutral area of the first converter station with the second neutral area of the second converter station, the first converter station additionally includes a third current sensor configured in use to measure the flow of current between the first neutral area and the return conduit, the second converter station additionally includes a fourth current sensor configured to measure the flow of current between the second neutral area and the return conduit, and the fault detector controller is additionally arranged in use in operative communication with the third and further current sensors, and is additionally programmed to distinguish between a ground fault in one or other of the first and second neutral areas and in the return conduit by checking for an erroneous difference in the flow of current measured by the third and fourth current sensors.

Having a fault detector controller additionally arranged in use in operative communication with such third and fourth current sensors, and being further programmed in the aforementioned manner, assists the fault detector to detect a ground fault in or adjacent to a return conduit within a power transmission scheme, and so extends the usefulness of the fault detector to additional power transmission scheme configurations.

Optionally the fault detector controller is further programmed to initiate in use a current imbalance between the first and second transmission conduits.

The provision of a current imbalance between the first and second transmission conduits (along with alternate grounding of one converter station and then the other), e.g. when the bipole power transmission scheme is configured in-use to operate in a rigid bipole mode with only one converter station grounded, beneficially helps permit the detection of a ground fault in the first and second neutral areas using the first and second voltage measurers.

Also, when the aforementioned bipole power transmission scheme is alternatively configured, in use, to operate in a balanced bipolar mode, with each converter station initially grounded, the provision of a current imbalance between the first and second transmission conduits (along with alternate grounding of one converter station and then the other) similarly helps permit the detection of a ground fault in the first and second neutral areas using the first and second voltage measurers.

Furthermore, when the bipole power transmission scheme additionally includes a return conduit and is operated in a balanced bipolar mode, the initiation of a current imbalance between the first and second transmission conduits causes a current to flow through the return conduit, and so helps permit the detection of a ground fault in the first and second neutral areas using the first and second current sensors, as well as distinguishing between a ground fault in the first and second neutral areas or in the return conduit using the third and fourth current sensors.

The first grounding circuit and the at least one of a first current sensor and a first voltage measurer may form a part of the fault detector.

Preferably the second grounding circuit and the at least one of a second current sensor and a second voltage measurer form a part of the fault detector.

In another preferred embodiment of the invention the third and fourth current sensors form a part of the fault detector.

Such fault detectors have the advantage of helping to ensure reliable and consistent inter-operation between the grounding circuits, the current sensors and the voltage measurers.

The fault detector may additionally include a first high-impedance element connected in use between the first neutral area and ground, and a second high-impedance element connected in use between the second neutral area and ground.

In a preferred embodiment of the invention at least one of the first and second high-impedance elements is switchable into and out of operation.

In another preferred embodiment of the invention each of the first and second high-impedance elements is one of a surge arrester or a high resistance.

The inclusion of such first and second high-impedance elements assists in the detection of respective ground faults via the checking for first and second erroneous voltage differences by the first and second voltage measurers.

According to a second aspect of the invention there is provided a bipole power transmission scheme comprising:
a first converter station;
first and second transmission conduits to in-use interconnect the first converter station with a second converter station positioned remote from the first converter station and thereby permit the transmission of power between the first and second converter stations, the first converter station having first and second power converters, the first power converter including a first DC terminal connected with the first transmission conduit, at least one AC terminal connected with a first AC network, and a second DC terminal interconnected with a third DC terminal of the second power converter by a first interconnection defining a first neutral area, the second power converter additionally including a fourth DC terminal connected with the second transmission conduit and at least one AC terminal connected with a second AC network, and the second converter station having third and fourth power converters, the third power converter including a fifth DC terminal connected with the first transmission conduit, at least one AC terminal connected with a third AC network, and a sixth DC terminal interconnected with a seventh DC terminal of the fourth power converter by a second interconnection defining a second neutral area, the fourth power converter additionally including an eighth DC terminal connected with the second transmission conduit and at least one AC terminal connected with a fourth AC network; and
a fault detector comprising:
 a first grounding circuit connected between the first neutral area and ground and switchable into and out of operation;
 at least one of a first current sensor configured to measure the flow of current between the first neutral area and ground and a first voltage measurer configured to measure the voltage difference between the first neutral area and ground; and
 a fault detector controller arranged in operative communication with the first grounding circuit and at least one of the first current sensor or the first voltage measurer, arranged in use in operative communication with a second grounding circuit connected between the second neutral area and ground and switchable into and out of operation, arranged in use in operative communication with at least one of a second current sensor configured to measure the flow of current between the second neutral area and ground and a second voltage measurer configured to measure the voltage difference between the second neutral area and ground, and programmed to detect a ground fault in one or other of the first and second neutral areas by:
configuring the first grounding circuit to be in operation and the second grounding circuit to be out of operation;
checking for at least one of a first erroneous current flow in the first neutral area using the first current sensor and a first erroneous voltage in the second neutral area using the second voltage measurer;
recognising a ground fault in the second neutral area if a first erroneous current flow is identified or if a first erroneous voltage is identified;
configuring the first grounding circuit to be out of operation and the second grounding circuit to be in operation;
checking for at least one of a second erroneous current flow in the second neutral area using the second current sensor and a second erroneous voltage in the first neutral area using the first voltage measurer; and
recognising a ground fault in the first neutral area if a second erroneous current flow is identified or if a second erroneous voltage is identified.

Such a bipole power transmission scheme shares the benefits associated with the features of the fault detector of the invention, but additionally consolidates control of ground fault detection with a first side of the scheme, i.e. the side having the first converter station.

According to a third aspect of the invention there is provided a bipole power transmission scheme comprising:
first and second converter stations positioned remote from one another;
first and second transmission conduits interconnecting the first and second converter stations with one another and thereby permitting the transmission of power between the first and second converter stations, the first converter station having first and second power converters, the first power converter including a first DC terminal connected with the first transmission conduit, at least one AC terminal connected with a first AC network, and a second DC terminal interconnected with a third DC terminal of the second power converter by a first interconnection defining a first neutral area, the second power converter additionally including a fourth DC terminal connected with the second transmission conduit and at least one AC terminal connected with a second AC network, and the second converter station having third and fourth power converters, the third power converter including a fifth DC terminal connected with the first transmission conduit, at least one AC terminal connected with a third AC network, and a sixth DC terminal interconnected with a seventh DC terminal of the fourth power converter by a second interconnection defining a second neutral area, the fourth power converter additionally including an eighth DC terminal connected with the second transmission conduit and at least one AC terminal connected with a fourth AC network; and
a fault detector comprising:
a first grounding circuit connected between the first neutral area and ground and switchable into and out of operation;
at least one of a first current sensor configured to measure the flow of current between the first neutral area and ground and a first voltage measurer configured to measure the voltage difference between the first neutral area and ground;
a second grounding circuit connected between the second neutral area and ground and switchable into and out of operation;
at least one of a second current sensor configured to measure the flow of current between the second neutral area and ground and a second voltage measurer configured in use to measure the voltage difference between the second neutral area and ground; and
a fault detector controller arranged in operative communication with the first and second grounding circuits and at least the first and second current sensors or the first and second voltage measurers, and programmed to detect a ground fault in one or other of the first and second neutral areas by:
configuring the first grounding circuit to be in operation and the second grounding circuit to be out of operation;
checking for at least one of a first erroneous current flow in the first neutral area using the first current sensor and a first erroneous voltage in the second neutral area using the second voltage measurer;
recognising a ground fault in the second neutral area if a first erroneous current flow is identified or if a first erroneous voltage is identified;
configuring the first grounding circuit to be out of operation and the second grounding circuit to be in operation;
checking for at least one of a second erroneous current flow in the second neutral area using the second current sensor and a second erroneous voltage in the first neutral area using the first voltage measurer; and
recognising a ground fault in the first neutral area if a second erroneous current flow is identified or if a second erroneous voltage is identified.

Such a bipole power transmission scheme shares the benefits associated with the features of the fault detector of the invention, but additionally ensures uniform control across the whole scheme.

According to a fourth aspect of the invention there is provided a method of detecting a fault in a bipole power transmission scheme including a first converter station positioned remote from a second converter station and first and second transmission conduits interconnecting the first and second converter stations to permit the transmission of power between the first and second converter stations,
the first converter station having first and second power converters, the first power converter including a first DC terminal connected with the first transmission conduit, at least one AC terminal connected with a first AC network, and a second DC terminal interconnected with a third DC terminal of the second power converter by a first interconnection defining a first neutral area, the second power converter additionally including a fourth DC terminal connected with the second transmission conduit and at least one AC terminal connected with a second AC network, and
the second converter station having third and fourth power converters, the third power converter including a fifth DC terminal connected with the first transmission conduit, at least one AC terminal connected with a third AC network, and a sixth DC terminal interconnected with a seventh DC terminal of the fourth power converter by a second interconnection defining a second neutral area, the fourth power converter additionally including an eighth DC terminal connected with the second transmission conduit and at least one AC terminal connected with a fourth AC network, the bipole power transmission scheme further including a fault detector comprising:

a first grounding circuit connected in use between the first neutral area and ground and switchable into and out of operation;

at least one of a first current sensor configured in use to measure the flow of current between the first neutral area and ground and a first voltage measurer configured in use to measure the voltage difference between the first neutral area and ground;

a second grounding circuit connected in use between the second neutral area and ground and switchable into and out of operation;

at least one of a second current sensor configured in use to measure the flow of current between the second neutral area and ground and a second voltage measurer configured in use to measure the voltage difference between the second neutral area and ground; and the said method detecting a ground fault in one or other of the first and second neutral areas by carrying out the following steps:

configuring the first grounding circuit to be in operation and the second grounding circuit to be out of operation;

checking for at least one of a first erroneous current flow in the first neutral area using the first current sensor and a first erroneous voltage in the second neutral area using the second voltage measurer;

recognising a ground fault in the second neutral area if a first erroneous current flow is identified or if a first erroneous voltage is identified;

configuring the first grounding circuit to be out of operation and the second grounding circuit to be in operation;

checking for at least one of a second erroneous current flow in the second neutral area using the second current sensor and a second erroneous voltage in the first neutral area using the first voltage measurer; and recognising a ground fault in the first neutral area if a second erroneous current flow is identified or if a second erroneous voltage is identified.

The method of the invention similarly shares the benefits associated with the corresponding features of the fault detector of the invention.

It will be appreciated that the use of the terms "first" and "second", and the like, in this patent specification is merely intended to help distinguish between similar features (e.g. the first and second converter stations, and the first and second transmission conduits), and is not intended to indicate the relative importance of one feature over another feature, unless otherwise specified.

Within the scope of this application it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

There now follows a brief description of preferred embodiments of the invention, by way of non-limiting example, with reference being made to the following figures in which.

Figure 3:
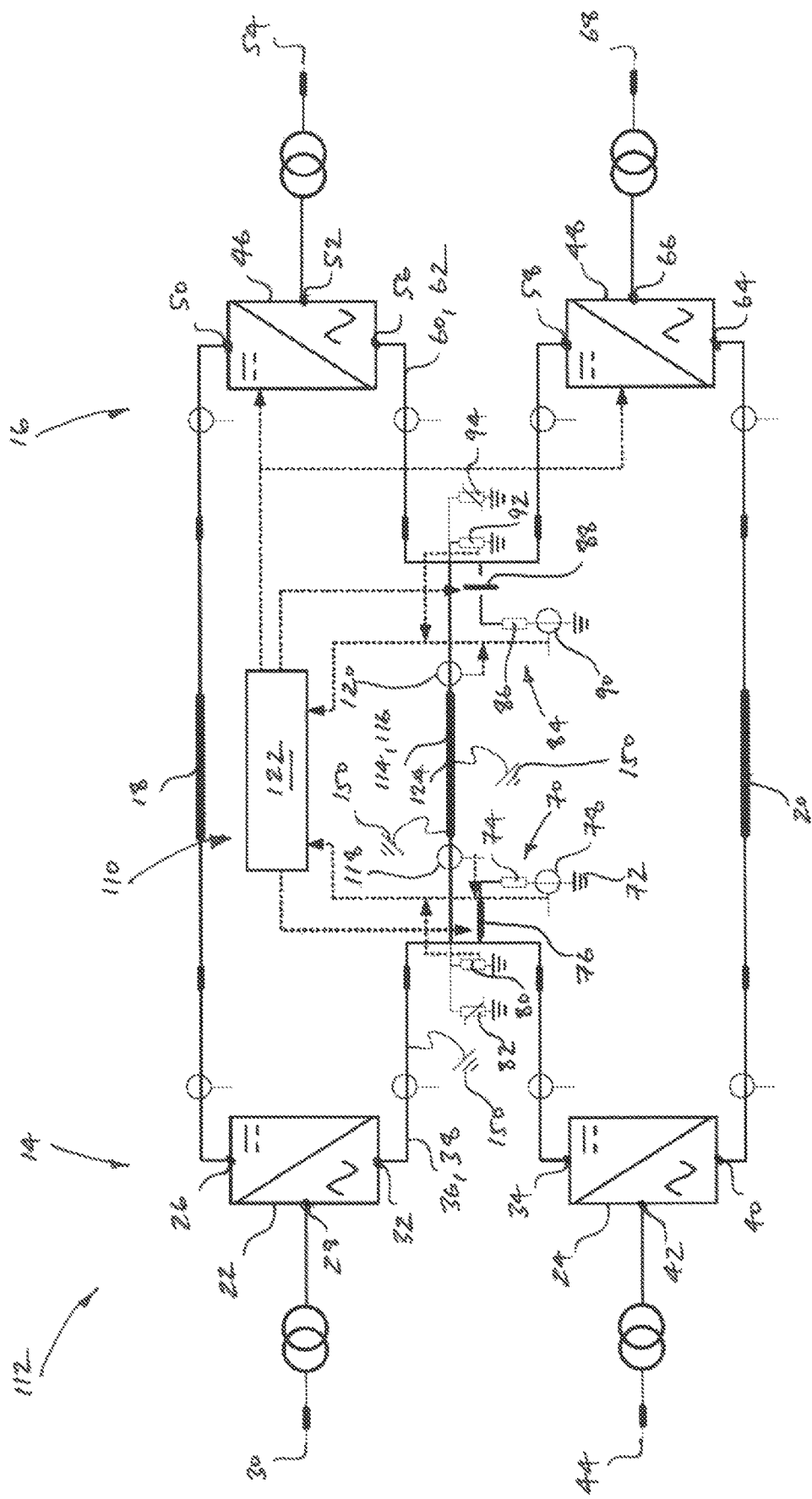
Figure 4:
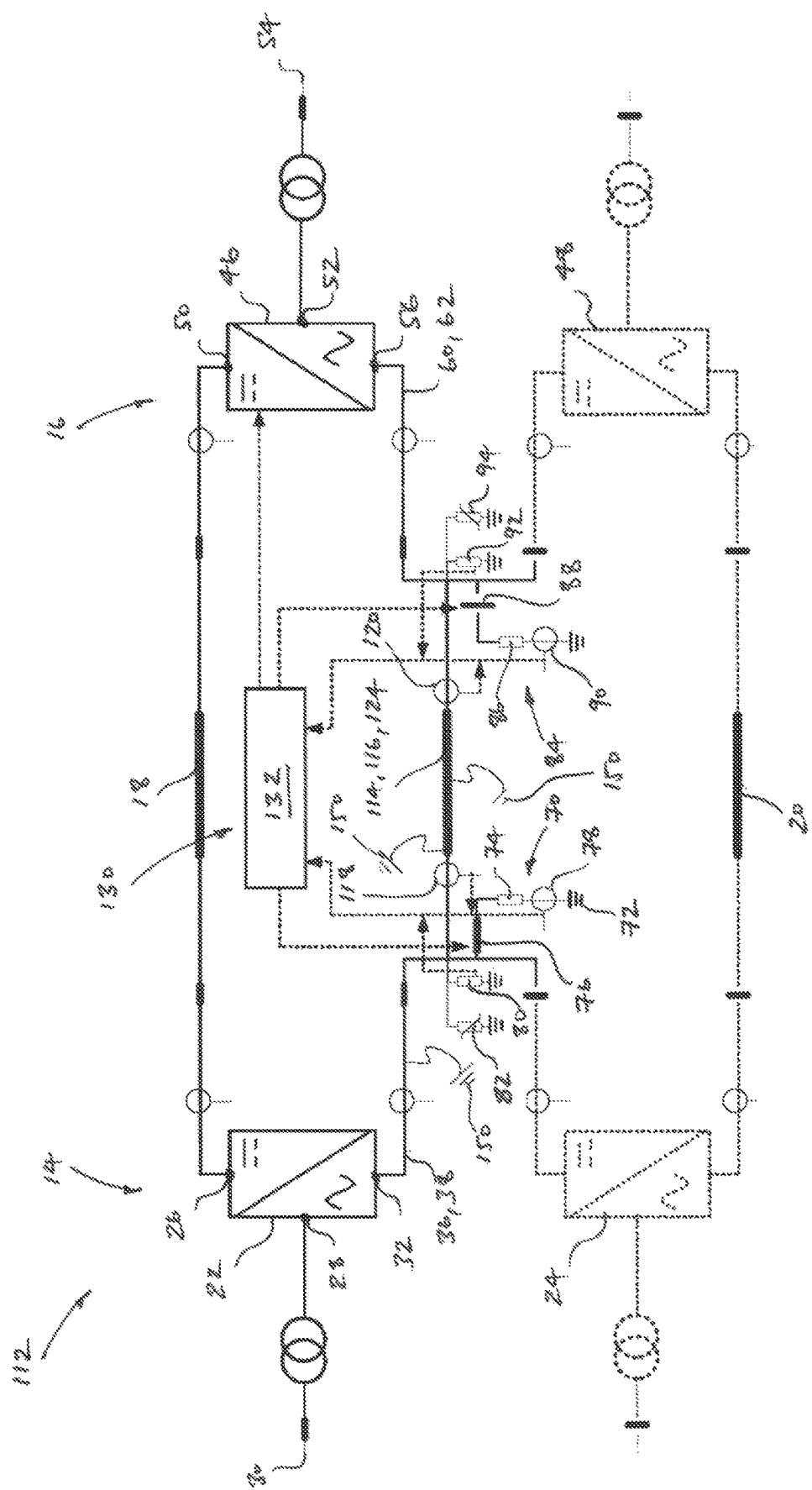

FIG. 3 shows a schematic view of a fault detector according to a third embodiment of the invention which forms a part of a second bipole power transmission scheme configured to operate in a third mode; and FIG. 4 shows a schematic view of a fault detector according to a fourth embodiment of the invention which forms a part of the second bipole power transmission scheme configured to operate in a fourth mode.

Figure 1:
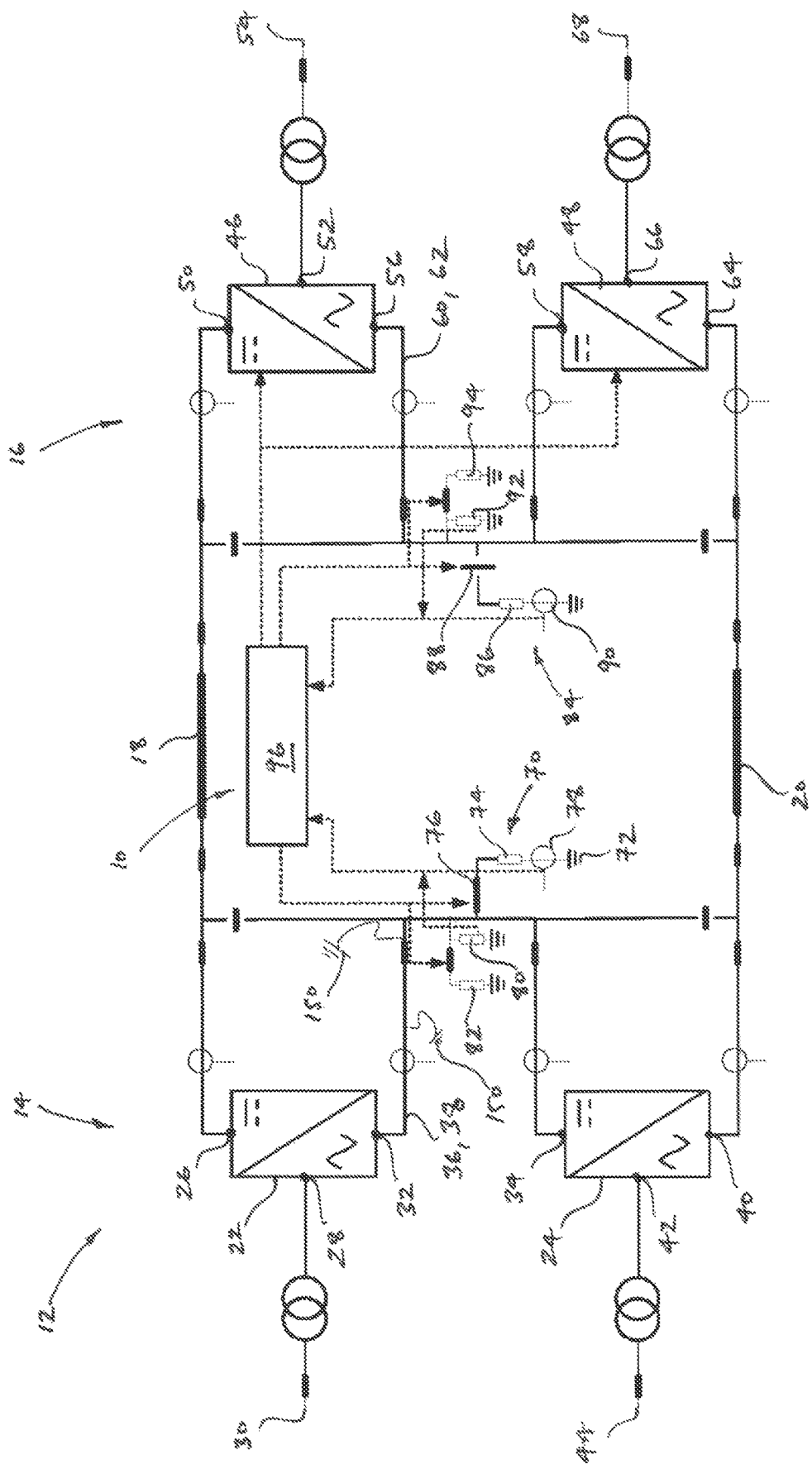
FIG. 1 shows a schematic view of a fault detector according to a first embodiment of the invention which forms a part of a first bipole power transmission scheme configured to operate in a first mode.

A fault detector according to a first embodiment of the invention is designated generally by reference numeral 10, as shown in FIG. 1.

The first fault detector 10 lies within a first bipole power transmission scheme 12 that is configured to operate in a first mode, which is a rigid bipole mode.

The first bipole power transmission scheme 12 includes a first converter station 14 that is positioned remote, i.e. spaced by a considerable distance, from a second converter station 16. The first converter station 14 may be an offshore converter station and the second converter station 16 may be an onshore converter station, although this need not necessarily be the case, e.g. both converter stations 14, 16 may be onshore converter stations.

Moreover, in the embodiment shown the first bipole power transmission scheme 12 includes the second converter station 16, e.g. the onshore converter station, but other embodiments may include only the first converter station 14, e.g. only an offshore converter station. Such other embodiments of the invention may be applicable when a third party owns or manages the second converter station and the downstream power transmission network associated therewith, and it is intended for the bipole power transmission scheme to interoperate with such a second converter station and associated power transmission network.

In any event, the first fault detector is preferably operationally associated with, i.e. located predominately within, one converter station or the other, even though it communicates with components from both converter stations. Still further embodiments of bipole power transmission schemes may include two fault detectors, each operationally associated with a given converter station.

Returning to the embodiment shown, the first and second converter stations 14, 16 are interconnected by first and second transmission conduits 18, 20, i.e. first and second 'poles' (hence the scheme constituting a 'bipole' scheme) which permit the transmission of power between the first and second converter stations 14, 16. Each of the first and second transmission conduits 18, 20 may be or include a subsea cable, an underground cable, an overhead line, or a mixture of such cables and line.

The first converter station 14 has first and second power converters 22, 24.

The first power converter 22 includes a first DC terminal 26 that is connected with the first transmission conduit 18.

It also includes three AC terminals 28 (only one of which is shown), each of which is connected with a respective phase of a first AC network 30.

Other embodiments may include fewer than or more than three AC terminals depending on the number of phases present in the first AC network. The first power converter 22 further includes a second DC terminal 32 which is interconnected with a third DC terminal 34 of the second power converter 24 by a first interconnection 36, e.g. a first connection bus, that defines a first neutral area 38.

The second power converter 24 additionally includes a fourth DC terminal 40 that is connected with the second transmission conduit 20, and three AC terminals 42 (only one of which is shown) that are connected with respective phases of a second AC network 44.

Meanwhile, the second converter station 16 has third and fourth power converters 46, 48.

The third power converter similarly 46 includes a fifth DC terminal 50 which is connected with the first transmission conduit 18, three AC terminals 52 (only one shown), each of which is connected with a respective phase of a third AC network 54, and a sixth DC terminal 56 that is interconnected with a seventh DC terminal 58 of the fourth power converter 48 by a second interconnection 60, e.g. a second connection bus, which defines a second neutral area 62.

The fourth power converter 48 additionally includes an eighth DC terminal 64 which is connected with the second transmission conduit 20, and three AC terminals 66 (only one shown), each of which is connected with a fourth AC network 68.

The first power converter 22 shown is a voltage source converter, although other types of power converter can be used.

The voltage source converter shown has a known configuration which includes three converter limbs that extend between the first and second DC terminals 26, 32 and which correspond to the respective phases of the first AC network 30. Each converter limb includes first and second limb portions which are separated by a corresponding of the AC terminals 28.

Each limb portion includes a chain-link converter which extends between the associated AC terminal 28 and a corresponding one of the first or the second DC terminal 26, 32. Each chain-link converter includes a plurality of series connected chain-link modules, while each chain-link module includes a number of switching elements which are connected in parallel with an energy storage device in the form of a capacitor (although other types of energy storage device, i.e. any device that is capable of storing and releasing energy to selectively provide a voltage, e.g. a fuel cell or battery, may also be used however).

The provision of a plurality of chain-link modules means that it is possible to build up a combined voltage across each chain-link converter, via the insertion of the energy storage devices, i.e. the capacitors, of multiple chain-link modules (with each chain-link module providing its own voltage), which is higher than the voltage available from each individual chain-link module.

Accordingly, each of the chain-link modules work together to permit the chain-link converter to provide a stepped variable voltage source. This permits the generation of a voltage waveform across each chain-link converter using a step-wise approximation. As such each chain-link converter is capable of providing a wide range of complex waveforms.

For example, operation of each chain-link converter in the foregoing manner can be used to generate an AC voltage waveform at each AC terminal 28, and thereby enable the voltage source converter to provide the aforementioned power transfer functionality, i.e. the transfer of power between the first AC network 30 and the first transmission conduit 18.

Each of the second, third and fourth power converters 24, 46, 48 is a similarly configured voltage source converter which provides the required power transfer functionality between the first and second transmission conduits 18, 20 and corresponding AC network 44, 54, 68. Other types of power converter can, however, be used.

The first converter station 14 also includes a first grounding circuit 70 that, in use, is connected between the first neutral area 38 and ground 72.

The first grounding circuit 70 is formed from a first grounding resistance 74, which typically is about 5Ω to 50Ω, that is switchable into and out of operation, i.e. is switchable so as to selectively connect and disconnect the first neutral area 38 and associated first converter station 14 to/from ground 72. In some embodiments (not shown) the first grounding resistance may be omitted, and grounding, i.e. solid grounding, provided merely by opening and closing the first grounding switch.

Such switching is provided by a first grounding switch 76, which preferably is a mechanical switch, e.g. a direct current commutation switch, a neutral bus ground switch, a fast switch, disconnector switch, or a Joslyn switch. The first grounding switch 76 may also be a power electronic switch, such as an Insulated Gate Bipolar Transistor (IGBT) or the like.

The first converter station 14 also includes a first current sensor 78, that is, in use, configured to measure the flow of current between the first neutral area 38 and ground 72, as well as a first voltage measurer 80, which is, in use, configured to measure the voltage difference between the first neutral area 38 and ground 72.

More particularly, in the embodiment shown, the first converter station 14 additionally includes a first high-impedance element 82 that is connected, in use, between the first neutral area 38 and ground 72, and the first voltage measurer 80 is configured to measure the voltage difference developed across the first high-impedance element 82.

The first high-impedance element 82 is a surge arrester, although in other embodiments of the invention it may instead be a high resistance, e.g. a resistance of approximately 100Ω to 5 kΩ, which may be switchable into and out of operation, i.e. may be selectively connected and disconnected between the first neutral area 38 and ground 72.

As well as the foregoing, the second converter station 16 also includes a second grounding circuit 84 that is, in use, connected between the second neutral area 62 and ground 72. The second grounding circuit 84 is similarly formed from a second grounding resistance 86, which again typically is about 5Ω to 50Ω, that is switchable into and out of operation by a second grounding switch 88. In some embodiments (not shown) the second grounding resistance may similarly also be omitted, and grounding provided merely by opening and closing the second grounding switch.

The second converter station 16 still further includes a second current sensor 90 which is, in use, configured to measure the flow of current between the second neutral area 62 and ground 72, as well as a second voltage measurer 92 that is, in use, configured to measure the voltage difference between the second neutral area 62 and ground 72.

The second converter station 16 shown, also similarly includes a second high-impedance element 94 that is connected, in use, between the second neutral area 62 and ground 72, and the second voltage measurer 92 is configured to measure the voltage difference developed across the second high-impedance element 94, which again is a surge arrester, although in other embodiments of the invention it may similarly instead be a high resistance that may be switchable into and out of operation.

Meanwhile, the first fault detector 10 includes a first fault detector controller 96 which is, in use, arranged in operative communication with the first and second grounding circuits (70, 84), the first and second current sensors (78, 90), and the first and second voltage measurers (80, 92).

In other embodiments of the invention (not shown) the first grounding circuit and at least one of the first current sensor or the first voltage measurer may form a part of the first fault detector. In still further embodiments of the invention (also not shown), the second grounding circuit and at least one of the second current sensor or the second voltage measurer may alternatively or additionally also form a part of the first fault detector. Such additional embodiments of the invention may also include one or both of the first and second high-impedance elements.

Returning to the embodiment shown, the first fault detector controller 96 is also programmed to detect a ground fault 150 in one or other of the first and second neutral areas 38, 62.

More particularly, as indicated above, when the first bipole power transmission scheme 12 is configured to operate in a rigid bipole mode with one converter station grounded, such that in normal operation any current flowing through ground 72 is essentially zero and therefore negligible, the first fault detector controller 96 is programmed to carry out the following, although not necessarily in the following order.

The first fault detector controller 96 configures the first grounding circuit 70 to be in operation, i.e. to be switched into operation by having the first grounding switch 76 closed, and the second grounding circuit 84 to be out of operation, i.e. by opening the second grounding switch 88.

The first fault detector controller 96 then initiates a temporary current imbalance between the first and second transmission conduits 18, 20, e.g. by communicating with separate controllers (not shown) in each of the first and second converter stations 14, 16 to alter the voltage and/or current carried by one or both of the first and second transmission conduits 18, 20.

Additionally, in embodiments of the invention having first and second high-impedance elements 82, 94 in the form of switchable high resistances, the first fault detector controller 96 is further programmed to switch the second high-impedance element 94, i.e. the second high resistance, into operation so that it is connected between the second neutral area 62 and ground 72, prior to initiating the aforementioned current imbalance.

Following this, the first fault detector controller 96 then checks for a first erroneous voltage in the second neutral area 62 using the second voltage measurer 92.

More particularly, the creation of a current imbalance between the first and second transmission conduits 18, 20 leads to the development of a voltage at the second converter station 16, i.e. in the second neutral area 62.

Absent any ground fault 150, the developed voltage would have an expected value which can be determined based on the level of unbalanced current flowing (which can be established from a consideration of measurements by one or both of the first and second current sensors 78, 90) and the corresponding impedance level of the second high-impedance element 94 at that level of current flow.

In contrast, in the case of a ground fault 150 in the second neutral area 62, the unbalanced current will flow through the lower impedance ground fault 150, instead of through the higher impedance second high-impedance element 94, with the result that the actual voltage developed in the second neutral area 62, i.e. as measured by the second voltage measurer 92, will be much lower than the expected developed voltage.

Accordingly, if the voltage measured by the second voltage measurer 92 is significantly lower than the expected developed voltage, the first fault detector controller 96 is able to identify a first erroneous voltage, and thereby recognise that there is a ground fault 150 in the second neutral area 62. In this regard, a developed voltage significantly lower than the expected developed voltage would be one that typically is about 70% to 80% below the expected voltage, although this threshold can vary and preferably takes into account factors such as voltage measurement accuracy.

Protective action can then be taken to disconnect the faulty area and the first bipole power transmission scheme 12 reconfigured as necessary. The said scheme 12 can then be restored to normal operation with a new configuration while the faulty area is repaired. In addition, the fault detector controller 96 can be programmed to carry out the aforementioned steps again, e.g. after a set interval of time has elapsed.

If the actual voltage developed in the second neutral area 62 is not significantly lower than the expected developed voltage, then the first fault detector controller 96 is programmed to rebalance the current in the first and second transmission conduits 18, 20 (in order to reduce any ground current to the minimum possible), and to then configure the first grounding circuit 70 to be out of operation, i.e. by opening the first grounding switch 76, and the second grounding circuit 84 to be in operation, i.e. by closing the second grounding switch 88.

The first fault detector controller 96 again then initiates a temporary current imbalance between the first and second transmission conduits 18, 20 and, in embodiments of the invention having first and second high-impedance elements 82, 94 in the form of switchable high resistances, the first fault detector controller 96 similarly switches the first high-impedance element 82, i.e. the first high resistance, into operation so that it is connected between the first neutral area 38 and ground 72, prior to initiating the aforementioned current imbalance.

The first fault detector controller 96 then checks for a second erroneous voltage in the first neutral area 38 using the first voltage measurer 80.

In a similar manner to above, the creation of a current imbalance between the first and second transmission conduits 18, 20 leads to the development of a voltage at the first converter station 14, i.e. in the first neutral area 38 which, again, absent any fault current, would have an expected value based on the level of unbalanced current flowing and the corresponding impedance level of the first high-impedance element 82 at that level of current flow.

Again, in the case of a ground fault 150 in the first neutral area 38, the unbalanced current will flow through the lower impedance ground fault 150, instead of through the higher impedance first high-impedance element 82, with the result that the actual voltage developed in the first neutral area 38, i.e. as measured by the first voltage measurer 80, will be much lower than the expected developed voltage.

Similarly, if the actual voltage developed in the first neutral area 38, i.e. as measured by the first voltage measurer 80, is significantly lower than the expected developed voltage, the first fault detector controller 96 is able to identify a second erroneous voltage, and thereby again recognise that there is a ground fault 150 in the first neutral area 38.

Protective action can again then be taken to disconnect the faulty area and the first bipole power transmission scheme 12 reconfigured as necessary, the said scheme 12 again restored to normal operation with a new configuration while the faulty area is repaired, and the first fault detector controller 96 programmed to carry out the aforementioned steps again, e.g. after another set interval of time has elapsed.

If the actual voltage developed in the first neutral area 38 is not significantly less than the expected developed voltage, then the first fault detector controller 96 is programmed to rebalance the current in the first and second transmission conduits 18, 20, and repeat the whole of the foregoing process after a further set interval of time.

The first fault detector 10 described hereinabove can also be used to detect ground faults 150 in the first and second neutral areas 38, 62 when the first bipole power transmission scheme 12 is configured to operate in another mode, that is a balanced bipolar mode (not shown) in which both the first and second converter stations 14, 16 are initially grounded, i.e. each of the first and second grounding circuits 70, 84 are switched into operation by having each of the corresponding first and second grounding switches 76, 88 closed.

In such circumstances, the first fault detector controller 96 of the first fault detector 10 is additionally programmed, prior to carrying out the detection process described above, to check whether the first bipole power transmission scheme 12 is operating in the first, rigid bipole mode and if not, to open the second grounding switch 88 to unground the second converter station 16.

Figure 2:
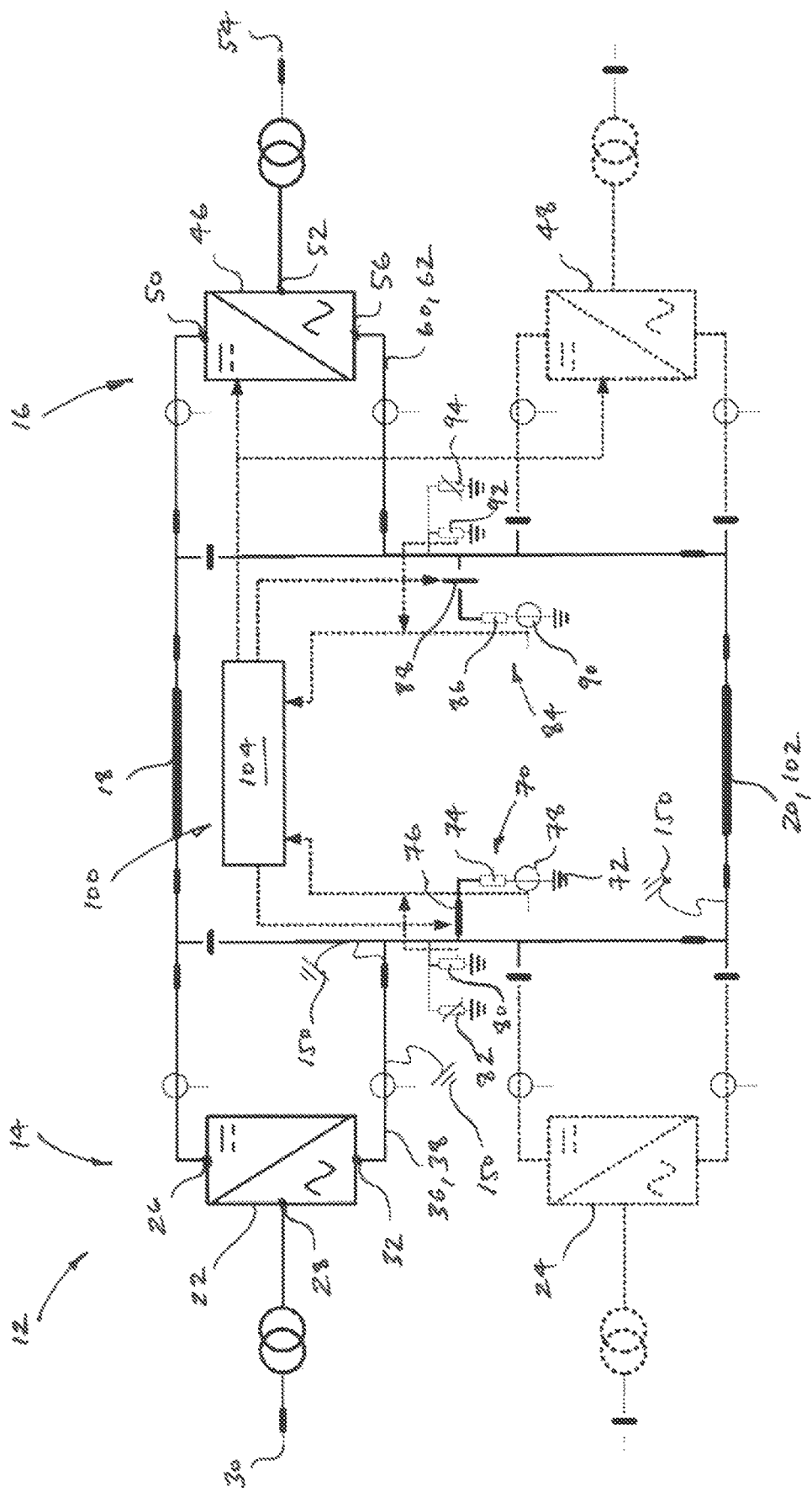
FIG. 2 shows a schematic view of a fault detector according to a second embodiment of the invention which forms a part of the first bipole power transmission scheme configured to operate in a second mode.

A fault detector according to a second embodiment of the invention is designated generally by reference numeral 100, as shown in FIG. 2.

The second fault detector 100 is similar to the first fault detector 10, and similarly lies within the first bipole power transmission scheme 12.

However, in relation to the second fault detector 100, the first bipole power transmission scheme 12 is instead configured to operate in a second mode, which is a monopole mode in which the second and fourth power converters 24, 48 are disconnected, and the second transmission conduit 20 acts as a return conduit that lies between the first and second neutral areas 38, 62 of the first and second converter stations 14, 16 and defines a first neutral conduit 102 that in effect extends those neutral areas 38, 62.

Meanwhile, features common to the first and second fault detectors, 10, 100 share the same reference numerals.

Accordingly, the second fault detector 100 similarly includes a second fault detector controller 104 but it is, in use, arranged in operative communication only with the first and second grounding circuits (70, 84) and the first and second current sensors (78, 90).

In other embodiments of the invention (not shown) the first grounding circuit and the first current sensor may form a part of the second fault detector. In still further embodiments of the invention (also not shown), the second grounding circuit and the second current sensor may alternatively or additionally also form a part of the second fault detector.

Returning to the embodiment shown, the second fault detector controller 104 is also programmed to detect a ground fault 150 in one or other of the first and second neutral areas 38, 62 which, as indicted above, additionally includes the first neutral conduit 102.

In this regard, when the first bipole power transmission scheme 12 is configured to operate in the aforementioned monopole mode with one converter station grounded, ground faults 150 close to the grounded converter station are normally difficult to identify because the ground fault 150 current flowing through the fault is essentially zero, i.e. negligible.

The second fault detector controller 104 is therefore programmed to carry out the following, although not necessarily in the following order.

The second fault detector controller 104 configures the first grounding circuit 70 to be in operation, i.e. to be switched into operation by having the first grounding switch 76 closed, and the second grounding circuit 84 to be out of operation, i.e. by opening the second grounding switch 88. In practice, such configuring by the second fault detector controller 104 may amount to no more than checking whether the first grounding circuit 70 is in operation.

The second fault detector controller 104 then checks for a first erroneous current flow in the first neutral area 38 using the first current sensor 78.

As mentioned above, in the event of a ground fault 150 close to the grounded first converter station 14, i.e. a ground fault 150 in the first neutral area 38, the ground fault current flowing through the fault will be essentially zero, and so no first erroneous current flow in the first neutral area 38, i.e. no current flow greater than, e.g. a predetermined protection setting, will flow. Hence no ground fault 150 is recognised by the second fault detector controller 104.

In contrast, if there is a ground fault 150 close to the ungrounded second converter station 16, i.e. a ground fault 150 in the second neutral area 62, the ground fault current flowing through the first neutral area 38, and hence through the first current sensor 78, will be non-negligible, i.e. will be greater than a predetermined protection setting.

The second fault detector controller 104 is programmed to identify such a first erroneous current flow and recognise that there is ground fault 150 in the second neutral area 62.

Protective action can then again be taken to disconnect the faulty area, and the first bipole power transmission scheme 12 reconfigured as necessary and restored to normal operation with a new configuration while the faulty area is repaired. In addition, the second fault detector controller 104 can be programmed to carry out the aforementioned steps again, e.g. after a set interval of time has elapsed.

If no first erroneous current flow is recognised, then the second fault detector controller 104 is programmed to configure the first grounding circuit 70 to be out of operation, i.e. by opening the first grounding switch 76, and the second grounding circuit 84 to be in operation, i.e. by closing the second grounding switch 88.

The second fault detector controller 104 then checks for a second erroneous current flow in the second neutral area 62 using the second current sensor 90.

In a similar but opposite manner to above, if there is a ground fault 150 close to the now ungrounded first converter station 14, i.e. a ground fault 150 in the first neutral area 38, the ground fault current flowing through the second neutral area 62, and hence through the second current sensor 90, will be non-negligible, i.e. will be greater than a predetermined protection setting. The second fault detector controller 104 is programmed to identify such a second erroneous current flow and recognise that there is ground fault 150 in the first neutral area 38.

Protective action can then again be taken to disconnect the faulty area, and the first bipole power transmission scheme 12 reconfigured as necessary and restored to normal operation with a new configuration while the faulty area is repaired. In addition, the second fault detector controller 104 can be programmed to carry out the aforementioned steps again, e.g. after a set interval of time has elapsed.

If no second erroneous current flow is identified, the second fault detector controller 104 is programmed to repeat the whole of the foregoing process after a further set interval of time.

The second fault detector 100 described hereinabove can also be used to detect ground faults 150 in the first and second neutral areas 38, 62 when the first bipole power transmission scheme 12 shown in FIG. 1 is configured to operate in another mode, that is a unbalanced bipolar mode (not shown) in which the first and second transmission conduits 18, 20 carry different voltages and/or currents.

A fault detector according to a third embodiment of the invention is designated generally by reference numeral 110, as shown in FIG. 3.

The third fault detector 110 is similar to the second fault detector 100, and features common to the second fault detector 100 share the same reference numerals, but the third fault detector 110 instead lies within a second bipole power transmission scheme 112.

In turn, the second bipole power transmission scheme 112 is similar to the first bipole power transmission scheme 12 but additionally includes a return conduit 114 that interconnects the first neutral area 38 of the first converter station 14 with the second neutral area 62 of the second converter station 14, and defines a second neutral conduit 124 that in effect extends those neutral areas 38, 62. The return conduit 114 is a dedicated metallic return 116, which typically takes the form of a subsea cable, although an electrical conductor of some other form may be used.

As such, the second bipole power transmission scheme 112 is configured to operate in a third mode, a balanced mode with dedicated metallic return.

Meanwhile, the third fault detector 110 differs the second fault detector 100 by including a third fault detector controller 122 that is additionally arranged, in use, in operative communication with both a third current sensor 118, which is configured to measure the flow of current between the first neutral area 38 and the return conduit 114, i.e. the dedicated metallic return 116, and a fourth current sensor 120, that is configured to measure the flow of current between the second neutral area 62 and the return conduit 114.

The third fault detector controller 122 is also additionally programmed to distinguish between a ground fault 150 in one or other of the first and second neutral areas 38, 62 and in the second neutral conduit 124, i.e. in the return conduit 114, by checking for an erroneous difference in the flow of current measured by the third and fourth current sensors 118, 120, i.e. by checking if the difference between the current flow measured by the fourth current sensor 120 and the third current sensor 118 is greater than a predetermined protection setting.

The third fault detector controller 122 also differs from the second fault detector controller 104 by being programmed to initiate a temporary current imbalance between the first and second transmission conduits 18, 20, prior to checking for any erroneous current flows or the aforementioned erroneous difference in the flow of current.

A fault detector according to a fourth embodiment of the invention is designated generally by reference numeral 130, as shown in FIG. 4.

The fourth fault detector 130 is similar to the third fault detector 110, and similarly lies within the second bipole power transmission scheme 112.

However, with respect to the fourth fault detector 130, the second bipole power transmission scheme 112 is instead configured to operate in a fourth mode, that is a monopole mode. In such a monopole mode, the second and fourth power converters 24, 48 are disconnected, along with the second transmission conduit 20, and the return conduit 114, i.e. dedicated metallic return 116, again defines a second neutral conduit 124 (which again in effect extends the first and second neutral areas 38, 62) but only in relation to a single 'pole', i.e. only in relation to the first transmission conduit 18.

Meanwhile, features common to the fourth and third fault detectors 130, 110 share the same reference numerals.

Accordingly, the fourth fault detector 130 includes a fourth fault detector controller 132 that is similar to the third fault detector controller 122, i.e. the fourth fault detector controller 132 is also programmed to distinguish between a ground fault 150 in one or other of the first and second neutral areas 38, 62 and in the second neutral conduit 124, i.e. in the return conduit 114, by checking for an erroneous difference in the flow of current measured by the third and fourth current sensors 118, 120, i.e. by checking if the difference between the current flow measured by the fourth current sensor 120 and the third current sensor 118 is greater than a predetermined protection setting.

We claim:

1. A fault detector for a bipole power transmission scheme including a first converter station positioned remote from a second converter station and first and second transmission conduits interconnecting the first and second converter stations to permit the transmission of power between the first and second converter stations, the first converter station having first and second power converters, the first power converter including a first DC terminal connected with the first transmission conduit, at least one AC terminal connected with a first AC network, and a second DC terminal interconnected with a third DC terminal of the second power converter by a first interconnection defining a first neutral area, the second power converter additionally including a fourth DC terminal connected with the second transmission conduit and at least one AC terminal connected with a second AC network, the first converter station additionally including a first grounding circuit connected in use between the first neutral area and ground and switchable into and out of operation, and at least one of a first current sensor configured in use to measure the flow of current between the first neutral area and ground and a first voltage measurer configured in use to measure the voltage difference between the first neutral area and ground, and the second converter station having third and fourth power converters, the third power converter including a fifth DC terminal connected with the first transmission conduit, at least one AC terminal connected with a third AC network, and a sixth DC terminal interconnected with a seventh DC terminal of the fourth power converter by a second interconnection defining a second neutral area, the fourth power converter additionally including an eighth DC terminal connected with the second transmission conduit and at least one AC terminal connected with a fourth AC network, the second converter station additionally including a second grounding circuit connected in use between the second neutral area and ground and switchable into and out of operation, and at least one of a second current sensor configured in use to measure the flow of current between the second neutral area and ground and a second voltage measurer configured in use to measure the voltage difference between the second neutral area and ground, the fault detector comprising a fault detector controller arranged in use in operative communication with the first and second grounding circuits and at least the first and second current sensors or the first and second voltage measurers, and being programmed to detect a ground fault in one or other of the first and second neutral areas by:

configuring the first grounding circuit to be in operation and the second grounding circuit to be out of operation;

checking for at least one of a first erroneous current flow in the first neutral area using the first current sensor and a first erroneous voltage in the second neutral area using the second voltage measurer;

recognising a ground fault in the second neutral area if a first erroneous current flow is identified or if a first erroneous voltage is identified;

configuring the first grounding circuit to be out of operation and the second grounding circuit to be in operation;

checking for at least one of a second erroneous current flow in the second neutral area using the second current sensor and a second erroneous voltage in the first neutral area using the first voltage measurer; and recognising a ground fault in the first neutral area if a second erroneous current flow is identified or if a second erroneous voltage is identified.

2. A fault detector according to claim 1, wherein:

the bipole power transmission scheme additionally includes a return conduit interconnecting the first neutral area of the first converter station with the second neutral area of the second converter station, the first converter station additionally includes a third current sensor configured in use to measure the flow of current between the first neutral area and the return conduit, the second converter station additionally includes a fourth current sensor configured to measure the flow of current between the second neutral area and the return conduit, and the fault detector controller is additionally arranged in use in operative communication with the third and further current sensors, and is additionally programmed to distinguish between a ground fault in one or other of the first and second neutral areas and in the return conduit by checking for an erroneous difference in the flow of current measured by the third and fourth current sensors.

3. A fault detector according to claim 1, wherein the fault detector controller is further programmed to initiate in use a current imbalance between the first and second transmission conduits.

4. A fault detector according to claim 1, wherein the first grounding circuit and the at least one of a first current sensor and a first voltage measurer form a part of the fault detector.

5. A fault detector according to claim 4, wherein the second grounding circuit and the at least one of a second current sensor and a second voltage measurer form a part of the fault detector.

6. A fault detector according to claim 4, wherein the third and fourth current sensors form a part of the fault detector.

7. A fault detector according to claim 4, additionally including a first high-impedance element connected in use between the first neutral area and ground, and a second high-impedance element connected in use between the second neutral area and ground.

8. A fault detector according to claim 7, wherein at least one of the first and second high-impedance elements is switchable into and out of operation.

9. A fault detector according to claim 7, wherein each of the first and second high-impedance elements is one of a surge arrester or a high resistance.

10. A bipole power transmission scheme, comprising:

a first converter station;

first and second transmission conduits to in-use interconnect the first converter station with a second converter station positioned remote from the first converter station and thereby permit the transmission of power between the first and second converter stations, the first converter station having first and second power converters, the first power converter including a first DC terminal connected with the first transmission conduit, at least one AC terminal connected with a first AC network, and a second DC terminal interconnected with a third DC terminal of the second power converter by a first interconnection defining a first neutral area, the second power converter additionally including a fourth DC terminal connected with the second transmission conduit and at least one AC terminal connected with a second AC network, and the second converter station having third and fourth power converters, the third power converter including a fifth DC terminal connected with the first transmission conduit, at least one AC terminal connected with a third AC network, and a sixth DC terminal interconnected with a seventh DC terminal of the fourth power converter by a second interconnection defining a second neutral area, the fourth power converter additionally including an eighth DC terminal connected with the second transmission conduit and at least one AC terminal connected with a fourth AC network; and a fault detector comprising:

a first grounding circuit connected between the first neutral area and ground and switchable into and out of operation;

at least one of a first current sensor configured to measure the flow of current between the first neutral area and ground and a first voltage measurer configured to measure the voltage difference between the first neutral area and ground; and a fault detector controller arranged in operative communication with the first grounding circuit and at least one of the first current sensor or the first voltage measurer, arranged in use in operative communication with a second grounding circuit connected between the second neutral area and ground and switchable into and out of operation, arranged in use in operative communication with at least one of a second current sensor configured to measure the flow of current between the second neutral area and ground and a second voltage measurer configured to measure the voltage difference between the second neutral area and ground, and programmed to detect a ground fault in one or other of the first and second neutral areas by:

configuring the first grounding circuit to be in operation and the second grounding circuit to be out of operation;

checking for at least one of a first erroneous current flow in the first neutral area using the first current sensor and a first erroneous voltage in the second neutral area using the second voltage measurer;

recognising a ground fault in the second neutral area if a first erroneous current flow is identified or if a first erroneous voltage is identified;

configuring the first grounding circuit to be out of operation and the second grounding circuit to be in operation;

checking for at least one of a second erroneous current flow in the second neutral area using the second current sensor and a second erroneous voltage in the first neutral area using the first voltage measurer; and recognising a ground fault in the first neutral area if a second erroneous current flow is identified or if a second erroneous voltage is identified.

11. A bipole power transmission scheme, comprising:

first and second converter stations positioned remote from one another;

first and second transmission conduits interconnecting the first and second converter stations with one another and thereby permitting the transmission of power between the first and second converter stations, the first converter station having first and second power converters, the first power converter including a first DC terminal connected with the first transmission conduit, at least one AC terminal connected with a first AC network, and a second DC terminal interconnected with a third DC terminal of the second power converter by a first interconnection defining a first neutral area, the second power converter additionally including a fourth DC terminal connected with the second transmission conduit and at least one AC terminal connected with a second AC network, and the second converter station having third and fourth power converters, the third power converter including a fifth DC terminal connected with the first transmission conduit, at least one AC terminal connected with a third AC network, and a sixth DC terminal interconnected with a seventh DC terminal of the fourth power converter by a second interconnection defining a second neutral area, the fourth power converter additionally including an eighth DC terminal connected with the second transmission conduit and at least one AC terminal connected with a fourth AC network; and a fault detector comprising:

a first grounding circuit connected between the first neutral area and ground and switchable into and out of operation;

at least one of a first current sensor configured to measure the flow of current between the first neutral area and ground and a first voltage measurer configured to measure the voltage difference between the first neutral area and ground;

a second grounding circuit connected between the second neutral area and ground and switchable into and out of operation;

at least one of a second current sensor configured to measure the flow of current between the second neutral area and ground and a second voltage measurer configured in use to measure the voltage difference between the second neutral area and ground; and a fault detector controller arranged in operative communication with the first and second grounding circuits and at least the first and second current sensors or the first and second voltage measurers, and programmed to detect a ground fault in one or other of the first and second neutral areas by:

configuring the first grounding circuit to be in operation and the second grounding circuit to be out of operation;

checking for at least one of a first erroneous current flow in the first neutral area using the first current sensor and a first erroneous voltage in the second neutral area using the second voltage measurer;

recognising a ground fault in the second neutral area if a first erroneous current flow is identified or if a first erroneous voltage is identified;

configuring the first grounding circuit to be out of operation and the second grounding circuit to be in operation;

checking for at least one of a second erroneous current flow in the second neutral area using the second current sensor and a second erroneous voltage in the first neutral area using the first voltage measurer; and recognising a ground fault in the first neutral area if a second erroneous current flow is identified or if a second erroneous voltage is identified.

12. A method of detecting a fault in a bipole power transmission scheme including a first converter station positioned remote from a second converter station and first and second transmission conduits interconnecting the first and second converter stations to permit the transmission of power between the first and second converter stations, the first converter station having first and second power converters, the first power converter including a first DC terminal connected with the first transmission conduit, at least one AC terminal connected with a first AC network, and a second DC terminal interconnected with a third DC terminal of the second power converter by a first interconnection defining a first neutral area, the second power converter additionally including a fourth DC terminal connected with the second transmission conduit and at least one AC terminal connected with a second AC network, and the second converter station having third and fourth power converters, the third power converter including a fifth DC terminal connected with the first transmission conduit, at least one AC terminal connected with a third AC network, and a sixth DC terminal interconnected with a seventh DC terminal of the fourth power converter by a second interconnection defining a second neutral area, the fourth power converter additionally including an eighth DC terminal connected with the second transmission conduit and at least one AC terminal connected with a fourth AC network, the bipole power transmission scheme further including a fault detector comprising:

a first grounding circuit connected in use between the first neutral area and ground and switchable into and out of operation;

at least one of a first current sensor configured in use to measure the flow of current between the first neutral area and ground and a first voltage measurer configured in use to measure the voltage difference between the first neutral area and ground;

a second grounding circuit connected in use between the second neutral area and ground and switchable into and out of operation;

at least one of a second current sensor configured in use to measure the flow of current between the second neutral area and ground and a second voltage measurer configured in use to measure the voltage difference between the second neutral area and ground; and the said method detecting a ground fault in one or other of the first and second neutral areas by carrying out the following steps:

configuring the first grounding circuit to be in operation and the second grounding circuit to be out of operation;

checking for at least one of a first erroneous current flow in the first neutral area using the first current sensor and a first erroneous voltage in the second neutral area using the second voltage measurer;

recognising a ground fault in the second neutral area if a first erroneous current flow is identified or if a first erroneous voltage is identified;

configuring the first grounding circuit to be out of operation and the second grounding circuit to be in operation;

checking for at least one of a second erroneous current flow in the second neutral area using the second current sensor and a second erroneous voltage in the first neutral area using the first voltage measurer; and recognising a ground fault in the first neutral area if a second erroneous current flow is identified or if a second erroneous voltage is identified.

* * * * *